United States Patent Office 3,155,532

Patented Nov. 3, 1964

3,155,532

METAL PLATING PROCESS

John M. Basile, Buffalo, N.Y., assignor to Union Carbide Corporation, a corporation of New York No Drawing. Filed Nov. 10, 1960, Ser. No. 68,366
9 Claims. (Cl. 117—47)

This invention relates to a method for coating surfaces with chromium, molybdenum, tungsten and/or vanadium.

Many processes are known for providing substrates with metal coatings. Included among these are vapor phase processes and dipping processes. However, no satisfactory process has been devised for the plating of substrates with chromium, molybdenum, tungsten and/or vanadium. Ideally, any plating or coating process should provide a uniform coating with good bonding at a low temperature. Present vapor phase processes do not satisfy these requirements. In addition, presently known dipping techniques do not provide suitable bonding of the coating metal to the substrate.

Accordingly, it is an object of this invention to provide an improved process for the coating of a substrate with chromium, molybdenum, tungsten and/or vanadium.

Other objects will be apparent from the subsequent disclosure and appended claims.

The process which satisfies the objects of the invention comprises heating a substrate to a temperature of between 450° C. and 1400° C., intimately contacting said substrate with a solution of a carbonyl of a metal selected from the group consisting of chromium, molybdenum, tungsten and vanadium, said solution being maintained under a hydrogen atmosphere, and cooling the coated substrate in a non-reactive atmosphere to a temperature below about 200° C. when the selected metal is chromium, tungsten or vanadium and below about 150° C. when the selected metal is molybdenum.

The substrate may be any material capable of withstanding the temperatures of the process and includes both metal and ceramic materials. The heating of the substrate may be accomplished by any suitable means such as ovens, inductive or resistance furnaces, etc. However, the heating should be effected in an inert or non-oxidizing atmosphere.

The solution utilized in the process comprises a carbonyl of the desired metal dissolved in a suitable organic solvent. These metal carbonyls have the following decomposition temperatures: chromium carbonyl, above 130° C.; molybdenum carbonyl, above 140° C.; tungsten carbonyl, above 150° C.; and vanadium carbonyl, above 100° C.

The essential characteristics of the solvent for the carbonyls are that it form a substantial volume of vapor when contacted with the heated substrate, and that it be free of substances which, at the temperatures of the carbonyl decomposition, will cause oxidation of either the substrate or the metal carbonyl. Thus, the solvent must be free from substances which, in contact with the heated substrate, produce gaseous oxygen, peroxides, sulfur, gaseous halogens, hydrogen sulfide, hydrogen chloride, and the like.

The preferred solvents have normal boiling points below 350° C. and include benzene, benzine, toluene, hexane, octane, kerosene, gasoline, and similar aromatic and aliphatic hydrocarbons, as well as the halogenated hydrocarbons, particularly the perhalogenated hydrocarbons wherein the halogen is fluorine and/or chlorine, and the polyoxyalkylene fluids, particularly those having methoxy end groups. The hydrocarbyl phosphites may also be used.

The concentration of the carbonyls in the solvent may be varied at will; solutions containing about 1 to 2 percent by weight of dissolved carbonyl have been found quite satisfactory although solutions containing as little as 0.01 percent are useful.

The temperature of the carbonyl solution may lie anywhere within the range from the freezing point of the solution to about the decomposition temperature of the carbonyl. However, the temperature of the liquid should be held at or below 40° C. for best results.

The substrate to be coated should be heated to a temperature of at least 450° C.; below this temperature, no satisfactory plating can be reliably obtained. The substrate temperature should not exceed 1400° C. at the time of carbonyl contacting; at temperatures in excess of 1400° C., solution decomposition is serious, and handling and other operational details are difficult. Best coatings of suitable thickness are obtained at temperatures in excess of 700° C. While definite improvements are obtained by utilizing the hydrogen atmosphere below 700° C., it is critical to do so above 700° C. in order to obtain a good, bright coating. Most effective coating is obtained in the range of from about 700° C. to about 950° C. In this range, good coating is obtained consistently, with smooth operation.

The preferred method of effecting contact between the solution and the heated substrate is by dipping the heated substrate into the liquid. However, suitable coatings are obtained by spraying the solution on the heated substrate.

It is possible by the process of the present invention to provide coatings of the metal on the substrate of the order of a few millionths of an inch in thickness to approximately a thousandth of an inch. Thus, it is possible to provide coatings so thin that they do not interfere with the tolerances required in the production of precision instruments; the instruments are, however, rendered impervious to corrosion and oxidation. Unlike electroplating the coating action is not straight line; instead, the metal moves in all directions and deposits uniformly on all surfaces. Thus, the method of coating is useful for plating threaded surfaces where a coating of uniform thickness is required.

It is possible to apply several coatings by the process of the present invention. In each instance the heating and contacting steps are repeated.

The cooling of the coated substrate may be readily effected by retaining the coated substrate in the atmosphere above the coating solution until the surface temperature has dropped to a level at which oxidation of the freshly deposited coating is avoided. Similarly, an atmosphere of pure organic solvent could be equally well employed provided excessive carburization does not result from decomposition of the solvent vapors. This surface temperature is about 200° C. for chromium, tungsten and vanadium and about 150° C. for molybdenum. For best results, however, the surface temperature should be reduced to room temperature in the non-reactive atmosphere.

The following examples will serve to illustrate the process of the invention:

*Example I*

A solution of 1.5 percent molybdenum hexacarbonyl in benzene was prepared at room temperature. A mild steel specimen, 2 inches by ½ inch by ⅛ inch, was heated under a flow of hydrogen gas in an electrically heated Vycor tube to a temperature of 950° C., at which time the specimen was introduced into the carbonyl solution maintained at 25° C. The immersion period was 2 seconds, after which the sample was removed, reheated from about 400° C. to 950° C., and redipped. This process was repeated until four immersions were obtained, after which the specimen was finally cooled in the surrounding hydrogen atmosphere to about room temperature. Upon inspection, a bright silvery molybdenum coating was observed on the surface, the weight of said coating deposited being 5.4 milligrams.

*Example II*

A solution of 1.5 percent molybdenum hexacarbonyl in benzene was prepared at room temperature. A mild steel specimen, 2 inches by ½ inch by ⅛ inch, was heated under a flow of hydrogen gas in an electrically heated Vycor tube to a temperature of 950° C., at which time the specimen was introduced into the carbonyl solution maintained at 16° C. The immersion period was 3 seconds, after which the sample was removed and cooled in the surrounding hydrogen atmosphere to about room temperature. Upon inspection, a bright silvery molybdenum coating was observed on the surface, the weight of said coating deposited being 1.5 milligrams.

*Example III*

A solution of 1 percent tungsten hexacarbonyl in benzene was prepared at 40° C. A mild steel specimen, 2 inches by ½ inch by 0.003 inch, was heated under a flow of hydrogen gas in an electrically heated Vycor tube to a temperature of about 850° C., at which time the specimen was introduced into the carbonyl solution maintained at 40° C. The immersion period was approximately 2 seconds, after which the sample was removed and reheated from about 250° C. to 850° C., and redipped. This process was repeated until four immersions were obtained, after which the specimen was finally cooled in the surrounding hydrogen atmosphere to about room temperature. Upon inspection, a bright silvery tungsten coating was observed on the surface, the coating weighing 2.6 milligrams.

*Example IV*

A solution of 1 percent tungsten hexacarbonyl in benzene was prepared at 40° C. A glazed porcelain boat was heated in a flow of hydrogen gas in an electrically heated Vycor tube to a temperature of 800° C., at which time the specimen was introduced into the carbonyl solution maintained at 40° C. The immersion period was 2 seconds, after which the sample was removed, reheated from about 600° C. to 800° C., and redipped. The process was repeated until four immersions were obtained, after which the specimen was finally cooled in the surrounding hydrogen atmosphere to about room temperature. Upon inspection, a bright silvery tungsten coating was observed on the surface.

*Example V*

A solution of 1 percent chromium hexacarbonyl in benzene was prepared at 40° C. A mild steel specimen, 2 inches by ½ inch by ⅛ inch, was heated under a flow of hydrogen gas in an electrically heated Vycor tube to a temperature of 950° C., at which time the specimen was introduced into the carbonyl solution maintained at 40° C. The immersion period was approximately 3 seconds, after which the sample was removed, reheated from about 500 to 950° C., and redipped. This process was repeated until six immersions were obtained, after which the specimen was finally cooled in the surrounding hydrogen atmosphere to about room temperature. Upon inspection, a bright silvery coating of chromium was observed on the surface, said coating weighing 11.0 milligrams.

What is claimed is:

1. A process for coating a substrate with a metal selected from the group consisting of chromium, molybdenum, tungsten and vanadium comprising heating said substrate to a temperature of between about 450° C. and 1400° C.; immersing said substrate in a solution of carbonyl of said selected metal maintained under a hydrogen atmosphere, whereby said carbonyl is caused to decompose to deposit a coating of said selected metal on said substrate; and cooling the coated substrate in a non-reactive atmosphere to a temperature below about 200° C. when said selected metal is in the group consisting of chromium, tungsten, and vanadium, and to a temperature below about 150° C. when said selected metal is molybdenum.

2. A process in accordance with claim 1 wherein the substrate is heated to a temperature in the range of from about 700° C. to about 950° C. prior to the immersing step.

3. A process for coating a substrate with molybdenum which comprises heating said substrate to a temperature in the range of from about 700° C. to about 950° C.; immersing said substrate in a solution of molybdenum hexacarbonyl maintained under a hydrogen atmosphere whereby said molybdenum carbonyl is caused to decompose to deposit a coating of molybdenum on said substrate; and cooling the molybdenum-coated substrate to a temperature below about 150° C. in a non-reactive atmosphere.

4. A process in accordance with claim 3 wherein said substrate is mild steel.

5. A process in accordance with claim 3 wherein said substrate is porcelain.

6. A process for coating a substrate with tungsten which comprises heating said substrate to a temperature in the range of from about 700° C. to about 950° C.; immersing said substrate in a solution of tungsten hexacarbonyl maintained under a hydrogen atmosphere whereby said tungsten carbonyl is caused to decompose to deposit a coating of tungsten on said substrate; and cooling the tungsten-coated substrate to a temperature below about 200° C. in a non-reactive atmosphere.

7. A process in accordance with claim 6 wherein said substrate is mild steel.

8. A process for coating a substrate with chromium which comprises heating said substrate to a temperature in the range of from about 700° C. to about 950° C.; immersing said substrate in a solution of chromium hexacarbonyl maintained under a hydrogen atmosphere whereby said chromium carbonyl is caused to decompose to deposit a coating of chromium on said substrate; and cooling the chromium-coated substrate to a temperature below about 200° C. in a non-reactive atmosphere.

9. A process in accordance with claim 8 wherein said substrate is mild steel.

References Cited in the file of this patent

UNITED STATES PATENTS 2,523,461 Young et al. ------------ Sept. 26, 1950

FOREIGN PATENTS 185,682 Switzerland ------------- Mar. 1, 1937

OTHER REFERENCES

Powell et al.: "Vapor Plating," 1955, John Wiley & Sons Inc., pp. 50–62.